United States Patent
Yamaue et al.

(10) Patent No.: US 11,302,938 B2
(45) Date of Patent: Apr. 12, 2022

(54) FUEL CELL SYSTEM

(71) Applicant: TOYOTA JIDOSHA KABUSHIKI KAISHA, Toyota (JP)

(72) Inventors: Keita Yamaue, Nisshin (JP); Yohei Okamoto, Toyota (JP); Hiroyuki Imanishi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 9 days.

(21) Appl. No.: 16/928,294

(22) Filed: Jul. 14, 2020

(65) Prior Publication Data

US 2021/0020966 A1 Jan. 21, 2021

(30) Foreign Application Priority Data

Jul. 17, 2019 (JP) .............................. JP2019-131753

(51) Int. Cl.

| | |
|---|---|
| *H01M 8/04007* | (2016.01) |
| *H01M 8/04029* | (2016.01) |
| *H01M 8/04746* | (2016.01) |
| *H01M 8/04537* | (2016.01) |
| *H01M 8/04791* | (2016.01) |

(Continued)

(52) U.S. Cl.
CPC ... *H01M 8/04074* (2013.01); *H01M 8/04029* (2013.01); *H01M 8/04768* (2013.01); *H01M 8/04044* (2013.01); *H01M 8/04634* (2013.01); *H01M 8/04723* (2013.01);
(Continued)

(58) Field of Classification Search
CPC ......... H01M 8/04074; H01M 8/04029; H01M 8/04768; H01M 8/04723; H01M 8/04949; H01M 8/04813; H01M 8/04649; H01M 8/04952; H01M 8/04485; H01M 8/04634; H01M 8/04037; H01M 8/04225; H01M 8/04302; H01M 8/04044; H01M 8/04228;
(Continued)

(56) References Cited

U.S. PATENT DOCUMENTS

2003/0072981 A1 4/2003 Imaseki et al.
2013/0034786 A1* 2/2013 Matsumoto ....... H01M 8/04089
429/429

(Continued)

FOREIGN PATENT DOCUMENTS

| JP | 2003-123813 | 4/2003 |
|---|---|---|
| JP | 2008-130476 | 6/2008 |
| JP | 2010-192141 | 9/2010 |

*Primary Examiner* — Matthew W Van Oudenaren
(74) *Attorney, Agent, or Firm* — Finnegan, Henderson, Farabow, Garrett & Dunner, LLP (57) ABSTRACT

A fuel cell system includes: a fuel cell stack; a first cooling medium circuit through which a cooling medium for cooling the fuel cell stack flows; an ion exchanger that removes ions in the cooling medium; a second cooling medium circuit in which the average ion concentration of the cooling medium is lower than that of the cooling medium in the first cooling medium circuit; a switching valve that switches between a flow state and a low flow state; a pump configured to cause the cooling medium in the second cooling medium circuit to flow into the first cooling medium circuit; and a control unit that, when a stop period of the fuel cell system is longer than a reference period, drives the pump with the switching valve switched to the flow state after the instruction to start the fuel cell system is input.

6 Claims, 5 Drawing Sheets

(51) Int. Cl.
    *H01M 8/04044*    (2016.01)
    *H01M 8/04701*    (2016.01)
    *H01M 8/04858*    (2016.01)

(52) U.S. Cl.
    CPC .... *H01M 8/04813* (2013.01); *H01M 8/04949* (2016.02); *H01M 2250/20* (2013.01)

(58) Field of Classification Search
    CPC ......... H01M 8/04641; H01M 8/04955; H01M 8/04067; H01M 2250/20
    See application file for complete search history.

(56) References Cited

U.S. PATENT DOCUMENTS

2016/0141680 A1* 5/2016 Yamada ............ H01M 8/04037
                                                    429/437
2017/0133696 A1* 5/2017 Komatsubara .... H01M 8/04074

* cited by examiner

FUEL CELL SYSTEM

INCORPORATION BY REFERENCE

The disclosure of Japanese Patent Application No. 2019-131753 filed on Jul. 17, 2019 including the specification, drawings and abstract is incorporated herein by reference in its entirety.

BACKGROUND

1. Technical Field

The disclosure relates to fuel cell systems.

2. Description of Related Art

Fuel cell systems are known which have a coolant flow path in a fuel cell stack and circulate a coolant between the fuel cell stack and a radiator to cool the fuel cell stack. In such fuel cell systems, the conductivity of the coolant may increase due to ions eluted from the radiator and a coolant pipe. Accordingly, as described in, e.g., Japanese Unexamined Patent Application Publication No. 2003-123813 (JP 2003-123813 A), an ion exchanger is hitherto provided in the coolant pipe to remove ions that are present in the coolant, thereby reducing the conductivity of the coolant.

SUMMARY

However, in order to remove ions in the coolant using the ion exchanger provided in the coolant pipe, it is necessary to circulate the coolant in the coolant pipe. While the fuel cell system is stopped, the coolant does not circulate in the coolant pipe. When the coolant is not circulating in the coolant pipe, ions eluted from the radiator and the coolant pipe cannot be removed by the ion exchanger, and the conductivity of the coolant may increase to an undesirable level.

The disclosure can be implemented in the following forms.

According to an aspect of the disclosure, a fuel cell system is provided. The fuel cell system includes: a fuel cell stack; a first cooling medium circuit through which a cooling medium for cooling the fuel cell stack flows; an ion exchanger provided in the first cooling medium circuit and configured to remove ions in the cooling medium flowing in the first cooling medium circuit; a second cooling medium circuit which is allowed to be connected to the first cooling medium circuit and in which average ion concentration of the cooling medium is lower than that of the cooling medium in the first cooling medium circuit, the average ion concentration being average ion concentration of the cooling medium while flow of the cooling medium is stopped; a switching valve configured to switch between a flow state and a low flow state, the flow state being a state in which the cooling medium having flowed through the second cooling medium circuit flows into the first cooling medium circuit, and the low flow state being a state in which the flow of the cooling medium from the second cooling medium circuit into the first cooling medium circuit is reduced as compared to the flow state; a pump configured to cause the cooling medium in the second cooling medium circuit to flow into the first cooling medium circuit when the switching valve is in the flow state; and a control unit configured such that, when a stop period, which is a period from a time the fuel cell system is stopped until an instruction to start the fuel cell system is input, is longer than a predetermined reference period, the control unit drives the pump with the switching valve switched to the flow state after the instruction to start the fuel cell system is input. According to the fuel cell system in the above aspect, when the stop period of the fuel cell system is longer than the reference period, the cooling medium in the second cooling medium circuit is caused to flow into the first cooling medium circuit after the instruction to start the fuel cell system is input. Accordingly, even when the ion concentration of the cooling medium in the first cooling medium circuit increases due to ions eluted into the cooling medium in the first cooling medium circuit because the stop period of the fuel cell system is longer than the reference period, the ion concentration of the cooling medium in the first cooling medium circuit is more quickly reduced when the fuel cell system is started. As a result, conductivity of the cooling medium in the first cooling medium circuit is reduced.

The fuel cell system in the above aspect may further include an insulation resistance detection unit configured to detect insulation resistance of the fuel cell stack insulated from ground by an insulation path including the cooling medium in the first cooling medium circuit. The control unit may be configured such that, after driving the pump with the switching valve switched to the flow state, the control unit switches the switching valve to the low flow state when the insulation resistance detected by the insulation resistance detection unit becomes higher than a predetermined first reference value. According to the fuel cell system in the above aspect, the insulation resistance of the fuel cell stack insulated from the ground by the insulation path including the cooling medium in the first cooling medium circuit varies mainly depending on the conductivity of the cooling medium in the first cooling medium circuit. The flow state is therefore maintained until the conductivity of the cooling medium in the first cooling medium circuit decreases to a value corresponding to the first reference value. The fuel cell stack is thus less likely to generate electric power when the conductivity of the cooling medium in the first cooling medium circuit is equal to or higher than the value corresponding to the first reference value.

The fuel cell system in the above aspect may further include a flow rate deriving unit configured to derive a cumulative value of a flow rate of the cooling medium having flowed through the second cooling medium circuit, after the cooling medium starts flowing from the second cooling medium circuit into the first cooling medium circuit as a result of driving the pump with the switching valve switched to the flow state. The control unit may be configured to switch the switching valve to the low flow state when the cumulative value of the flow rate of the cooling medium derived by the flow rate deriving unit becomes larger than a predetermined second reference value. According to the fuel cell system in the above aspect, once the switching valve is switched to the low flow state, the cooling medium in the second cooling medium circuit will not flow into the first cooling medium circuit and will not flow through the ion exchanger. The amount of cooling medium that can flow in the ion exchanger is therefore reduced. That is, the amount of cooling medium whose ion concentration is to be reduced using the ion exchanger is reduced. The conductivity of the cooling medium in the first cooling medium circuit is thus more quickly reduced using the ion exchanger.

The fuel cell system in the above aspect may further include a conductivity sensor configured to measure the conductivity of the cooling medium in the first cooling medium circuit, or an ion concentration sensor configured to measure the ion concentration of the cooling medium in the first cooling medium circuit. The control unit may be configured to switch the switching valve to the low flow state when the conductivity measured by the conductivity sensor becomes lower than a third reference value determined in advance for the conductivity, or when the ion concentration measured by the ion concentration sensor becomes lower than a third reference value determined in advance for the ion concentration, after the control unit drives the pump with the switching valve switched to the flow state. According to the fuel cell system in the above aspect, the flow state is maintained until the conductivity or ion concentration of the cooling medium in the first cooling medium circuit decreases to the third reference value. The fuel cell is therefore less likely to generate electric power while the conductivity in the first cooling medium circuit is high.

In the fuel cell system in the above aspect, the control unit may be configured to, when the stop period is equal to or shorter than the reference period, set the switching valve to the low flow state after the instruction to start the fuel cell system is input. According to the fuel cell system in the above aspect, when the stop period is equal to or shorter than the reference period, the second cooling medium circuit can be used without being affected by the first cooling medium circuit after the instruction to start the fuel cell system is input.

In the fuel cell system in the above aspect, the second cooling medium circuit may be an air conditioning circuit configured to perform heating using heat of the cooling medium in the second cooling medium circuit. With this configuration, the conductivity of the cooling medium for cooling the fuel cell stack is reduced using the cooling medium in the air conditioning circuit when the fuel cell system is started.

The disclosure can be implemented in various modes other than those described above. For example, the disclosure can be implemented in modes such as a method for controlling a fuel cell system and a vehicle equipped with a fuel cell system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment (A-1) Overall Configuration of Fuel Cell Vehicle

Figure 1:
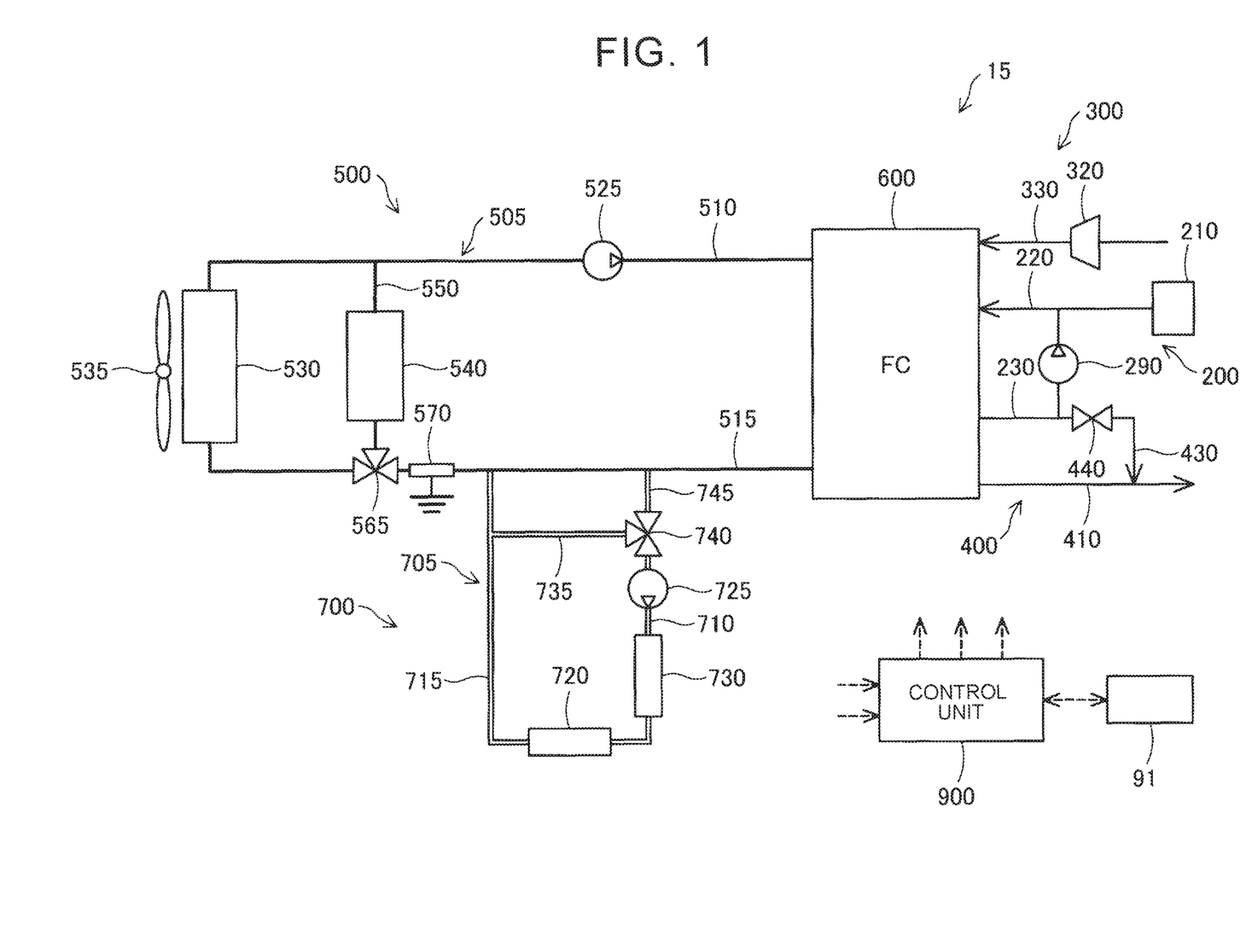
FIG. 1 schematically illustrates a general configuration of a fuel cell system.

FIG. 1 schematically illustrates a general configuration of a fuel cell system 15 according to a first embodiment of the disclosure. The fuel cell system 15 includes a fuel cell stack 600, a fuel gas supply system 200, an oxidizing gas supply system 300, an exhaust gas system 400, a cooling system 500, an air conditioning system 700, an insulation resistance detection unit 91, and a control unit 900. The fuel cell system 15 of the present embodiment is mounted on a vehicle and is used as a power supply for driving the vehicle.

The fuel cell stack 600 of the present embodiment has a stacked structure in which a plurality of single cells are stacked. The fuel cell stack 600 is supplied with fuel gas containing hydrogen and oxidizing gas containing oxygen to generate electric power. The fuel cell stack 600 of the present embodiment is a polymer electrolyte fuel cell stack. In each single cell that forms the fuel cell stack 600, a flow path through which fuel gas flows (anode-side flow path) is formed on the anode side, a flow path through which oxidizing gas flows (cathode-side flow path) is formed on the cathode side, and an electrolyte membrane is interposed between the anode-side flow path and the cathode-side flow path. A cooling medium flow path through which a cooling medium for cooling the fuel cell stack 600 flows is formed in the fuel cell stack 600. The fuel cell stack 600 is not limited to the polymer electrolyte fuel cell stack and may be other types of fuel cell stacks such as a solid oxide fuel cell stack.

The fuel gas supply system 200 includes a fuel gas tank 210, a fuel gas supply pipe 220, a fuel gas recirculation pipe 230, and a hydrogen pump 290. The fuel gas tank 210 is a storage device that stores hydrogen gas as fuel gas, and is connected to the fuel cell stack 600 via the fuel gas supply pipe 220. The flow rate of fuel gas that is supplied from the fuel gas tank 210 to the fuel cell stack 600 is adjusted by a control valve (not shown) provided in the fuel gas supply pipe 220.

The fuel gas recirculation pipe 230 is connected to the fuel cell stack 600 and the fuel gas supply pipe 220 and circulates anode exhaust gas discharged from the fuel cell stack 600 to the fuel gas supply pipe 220. The fuel gas recirculation pipe 230 is provided with the hydrogen pump 290 in order to generate a driving force for circulating fuel gas in the flow path to adjust the flow rate of the fuel gas.

The fuel gas recirculation pipe 230 is connected to a fuel gas discharge pipe 430, described later, through a purge valve 440, described later. The anode exhaust gas contains impurities such as nitrogen and water vapor in addition to hydrogen that has not been consumed for power generation. When the purge valve 440 is opened, the anode exhaust gas containing the impurities is discharged from the fuel gas recirculation pipe 230 into the fuel gas discharge pipe 430.

The oxidizing gas supply system 300 includes an air compressor 320 and an oxidizing gas supply pipe 330. The fuel cell stack 600 of the present embodiment uses air as oxidizing gas. The air compressor 320 compresses air taken in from the outside of the fuel cell system 15 and supplies the compressed air to the cathode-side flow paths of the fuel cell stack 600 through the oxidizing gas supply pipe 330.

The exhaust gas system 400 includes an exhaust gas pipe 410, the fuel gas discharge pipe 430, and the purge valve 440. The exhaust gas pipe 410 is a flow path through which cathode exhaust gas is discharged from the fuel cell stack 600. As described above, the fuel gas discharge pipe 430 has its one end connected to the fuel gas recirculation pipe 230 via the purge valve 440 and the other end connected to the exhaust gas pipe 410. Hydrogen contained in the anode exhaust gas discharged from the fuel gas recirculation pipe 230 via the purge valve 440 is thus diluted with the cathode exhaust gas before being emitted to the atmosphere.

The cooling system 500 includes a cooling medium supply pipe 510, a cooling medium discharge pipe 515, a cooling medium bypass pipe 550, a cooling medium pump 525, a radiator 530, an ion exchanger 540, and a flow divider valve 565. The cooling medium supply pipe 510 is a pipe for supplying a cooling medium to the fuel cell stack 600, and the cooling medium supply pipe 510 is provided with the cooling medium pump 525. The cooling medium discharge pipe 515 is a pipe for discharging the cooling medium from the fuel cell stack 600. The radiator 530 for cooling the cooling medium is provided between a downstream part of the cooling medium discharge pipe 515 and an upstream part of the cooling medium supply pipe 510. The radiator 530 is provided with a radiator fan 535 that facilitates heat dissipation from the radiator 530. The cooling medium pump 525 adjusts the flow rate of the cooling medium that circulates through the cooling medium supply pipe 510, the cooling medium discharge pipe 515, and the cooling medium flow path in the fuel cell stack 600. A flow path formed by the cooling medium pipes included in the cooling system 500, namely a flow path formed by the cooling medium supply pipe 510, the cooling medium discharge pipe 515, and the cooling medium bypass pipe 550 which include the pipes for circulating the cooling medium between the fuel cell stack 600 and the radiator 530, is referred to as a "first cooling medium circuit 505."

Ions (e.g., potassium ions and fluorine ions) are eluted from the radiator 530 into the cooling medium. For example, the cause for this elution is as follows. A process of removing an oxide film from constituent members of the radiator 530 is performed in the manufacturing process of the radiator 530. Flux is a material that is used to remove the oxide film, and a component of the flux remains on the surface of the radiator 530 in the process of removing the oxide film and is eluted as ions into the cooling medium. Even when such a process of removing the oxide film is not performed, other types of ions may be eluted from the radiator 530 into the cooling medium.

The cooling medium bypass pipe 550 is a flow path connecting the cooling medium supply pipe 510 and the cooling medium discharge pipe 515. The ion exchanger 540 is provided in the cooling medium bypass pipe 550. The ion exchanger 540 contains an ion exchange resin and removes ions that are present in the cooling medium by adsorbing the ions on the ion exchange resin.

The flow divider valve 565 is provided at the joint between the cooling medium discharge pipe 515 and the cooling medium bypass pipe 550. The flow divider valve 565 is a valve that can change the ratio between the cooling medium that flows through the radiator 530 and the cooling medium that bypasses the radiator 530. In the present embodiment, the flow divider valve 565 is composed of a rotary valve. When the flow divider valve 565 is fully open (valve opening is 100%), the entire amount of cooling medium flowing into the flow divider valve 565 flows into the cooling medium bypass pipe 550. When the flow divider valve 565 is fully closed (valve opening is 0%), the entire amount of cooling medium having flowed into the flow divider valve 565 flows into the radiator 530. The opening of the flow divider valve 565 can be changed between 0% and 100%.

An earth connection portion 570 connected to the earth is provided in the cooling medium flow path included in the cooling system 500. The earth connection portion 570 is composed of a metal pipe provided in a part of the cooling medium flow path. In the present embodiment, the earth connection portion 570 is provided in the cooling medium discharge pipe 515. That is, in the present embodiment, the metal pipe provided in the cooling medium discharge pipe 515 is electrically connected to the body earth.

Examples of the cooling medium in the cooling system 500 include antifreezes such as ethylene glycol and water.

The air conditioning system 700 is used to heat the interior of a fuel cell vehicle and includes a branch pipe 745, a switching valve 740, a hot water supply pipe 710, an air conditioning pump 725, an electric heater 730, a heater core 720, a hot water discharge pipe 715, and a hot water recirculation pipe 735. The branch pipe 745 and the hot water discharge pipe 715 are connected to the above-described cooling medium discharge pipe 515 of the cooling system 500, and the branch pipe 745, the hot water supply pipe 710, and the hot water discharge pipe 715 are connected in this order. A flow path formed by the cooling medium pipes in the air conditioning system 700, namely a flow path formed by the branch pipe 745, the hot water discharge pipe 715, and the hot water recirculation pipe 735, is a cooling medium flow path through which the cooling medium bypasses a part of the first cooling medium circuit 505 in the cooling system 500. Such a cooling medium flow path in the air conditioning system 700 is also referred to as a "second cooling medium circuit 705." Unlike the first cooling medium circuit 505 in the cooling system 500, the second cooling medium circuit 705 does not have a structure such as the radiator 530 from which a particularly large amount of ions are eluted into the cooling medium, and the amount of ions that are eluted into the cooling medium flowing in the flow path is smaller in the second cooling medium circuit 705 than in the first cooling medium circuit 505. Accordingly, in the second cooling medium circuit 705, the average ion concentration of the cooling medium while the flow of the cooling medium is stopped is lower than in the first cooling medium circuit 505. That is, when the first cooling medium circuit 505 and the second cooling medium circuit 705 are left with circulation of the cooling medium being stopped and ions are eluted into the cooling medium in each of the cooling medium flow paths of the first cooling medium circuit 505 and the second cooling medium circuit 705, the average ion concentration in the cooling medium flow path is lower in the second cooling medium circuit 705 than in the first cooling medium circuit 505. The second cooling medium circuit 705 in the air conditioning system 700 is an "air conditioning circuit" that heats the interior of the fuel cell vehicle using heat of the cooling medium in the cooling medium circuit.

The air conditioning system 700 has the switching valve 740 at the joint between the branch pipe 745 and the hot water supply pipe 710. The hot water recirculation pipe 735 connects the hot water discharge pipe 715 and the switching valve 740. The switching valve 740 is configured as a three-way valve. The switching valve 740 switches between a "flow state" and a "low flow state." The "flow state" is the state in which the cooling medium having flowed through the second cooling medium circuit 705 in the air conditioning system 700 flows into the first cooling medium circuit 505 in the cooling system 500, and the "low flow state" is the state in which the flow of the cooling medium from the second cooling medium circuit 705 into the first cooling medium circuit 505 is reduced as compared to the "flow state." In the present embodiment, the flow of the cooling medium between the first cooling medium circuit 505 and the second cooling medium circuit 705 is cut off in the "low flow state." However, a small amount of cooling medium may be allowed to flow from the second cooling medium circuit 705 into the first cooling medium circuit 505 in the "low flow rate."

The hot water supply pipe 710 is provided with the air conditioning pump 725 and the electric heater 730. The air conditioning pump 725 generates a driving force for the cooling medium to flow through the pipes of the air conditioning system 700, and the electric heater 730 heats the cooling medium flowing through the hot water supply pipe 710. The heater core 720 is provided at the joint between the hot water supply pipe 710 and the hot water discharge pipe 715. The heater core 720 heats air using heat of the cooling medium flowing through the air conditioning system 700. The air heated by the heater core 720 is sent to the interior of the fuel cell vehicle and used to heat the interior of the vehicle. The hot water recirculation pipe 735 returns the cooling medium discharged from the heater core 720 into the hot water supply pipe 710. When the switching valve 740 is switched to the "flow state," the air conditioning pump 725 functions as a pump that causes the cooling medium in the second cooling medium circuit 705 to flow into the first cooling medium circuit 505.

The control unit 900 is composed of a microcomputer and has a central processing unit (CPU), a read only memory (ROM), a random access memory (RAM), and an input/output port. The control unit 900 controls power generation of the fuel cell system 15 and controls the entire fuel cell vehicle. The control unit 900 obtains output signals from sensors provided in various parts of the fuel cell vehicle (including sensors provided in various parts of the fuel cell system 15, an accelerator operation amount sensor, a brake pedal sensor, a shift position sensor, and a vehicle speed sensor). The control unit 900 outputs drive signals to each unit of the fuel cell vehicle which is related to power generation, driving of the fuel cell vehicle, etc. Specifically, the control unit 900 outputs drive signals to, e.g., the air compressor 320, pumps such as the hydrogen pump 290, the cooling medium pump 525, and the air conditioning pump 725, various valves described above, etc. The control unit 900 that performs the above functions need not necessarily be configured as a single control unit. For example, the control unit 900 may be composed of a plurality of control units such as a control unit related to operation of the fuel cell system 15, a control unit related to traveling of the fuel cell vehicle, and a control unit that controls vehicle auxiliary devices that are not related to traveling of the fuel cell vehicle, and necessary information may be sent between or among the plurality of control units.

Figure 2:
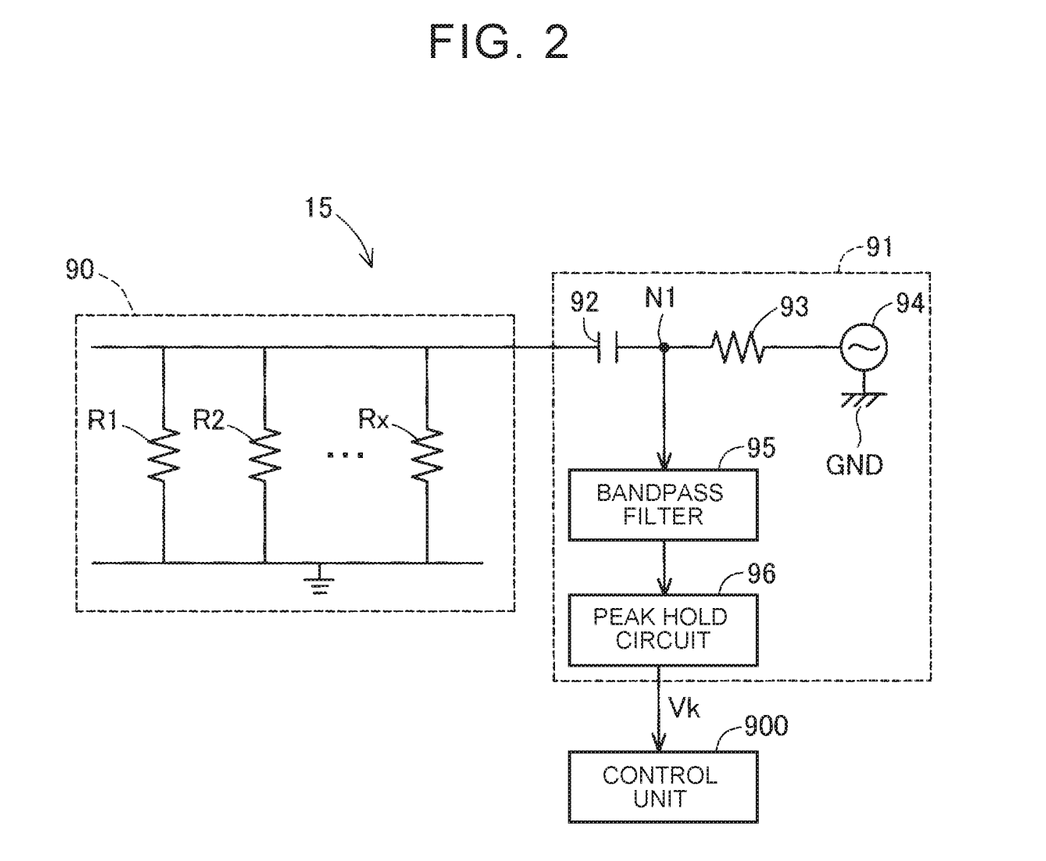
FIG. 2 illustrates an insulation resistance detection unit of the fuel cell system.

FIG. 2 illustrates the insulation resistance detection unit 91 of the fuel cell system 15. The insulation resistance detection unit 91 detects the insulation resistance of the fuel cell stack 600 insulated from the ground by an insulation path including the cooling medium in the first cooling medium circuit 505. Specifically, the insulation resistance detection unit 91 of the present embodiment detects the overall peak value Vk of the fuel cell system 15 as a value indicating the insulation resistance of the fuel cell stack 600 insulated from the ground by the insulation path including the cooling medium in the first cooling medium circuit 505. The detected peak value Vk is sent to the control unit 900. The insulation resistance detection unit 91 will be described in more detail.

In a circuit system 90 in FIG. 2, elements of the fuel cell system 15 which have electrical resistors are illustrated as circuitry. Resistors R1, R2, . . . , Rx of the circuit system 90 are the resistors of the elements of the fuel cell system 15 (e.g., the air compressor 320, a motor for the radiator fan 535, and the first cooling medium circuit 505 shown in FIG. 1).

The insulation resistance detection unit 91 includes an alternating current (AC) power supply 94, a resistor 93, a capacitor 92, a bandpass filter 95, and a peak hold circuit 96.

The AC power supply 94 and the resistor 93 are connected in series between a node N1 and a ground node GND (vehicle chassis or body). The capacitor 92 is connected between the node N1 and the circuit system 90.

The AC power supply 94 outputs a low-frequency AC signal. The AC signal is a signal for detecting the insulation resistance. In the present embodiment, the frequency of the AC signal is 2.5 Hz, and the voltage of the AC signal is 5 V. The AC signal is input to the circuit system 90 via the capacitor 92. The circuit system 90 that forms a direct current (DC) power supply circuit is thus separated from the insulation resistance detection unit 91 direct current-wise. The circuit system 90 is therefore insulated from the ground.

The bandpass filter 95 receives the AC signal on the node N1. The bandpass filter 95 extracts a 2.5 Hz component from the received AC signal and applies the extracted 2.5 Hz component to the peak hold circuit 96. The peak hold circuit 96 holds the peak of the 2.5 Hz AC signal received from the bandpass filter 95 and sends the held peak value Vk to the control unit 900.

The peak value Vk is a value that decreases as the value of the insulation resistance decreases and increases as the value of the insulation resistance increases. As described above, the peak value Vk is a value indicating the insulation resistance of the fuel cell stack 600 insulated from the ground by the insulation path including the cooling medium in the first cooling medium circuit 505. Of the resistances of the resistors R1, R2, . . . , Rx of the circuit system 90, the resistance that varies particularly significantly is the resistance of the cooling medium in the first cooling medium circuit 505 in which the conductivity of the cooling medium increases due to elution of ions. Accordingly, in the present embodiment, the value of the peak value Vk is used as a value indicating the insulation resistance of the cooling medium in the first cooling medium circuit 505 between the fuel cell stack 600 and the earth connection portion 570.

(A-2) Operation Upon Starting of System

Figure 3:
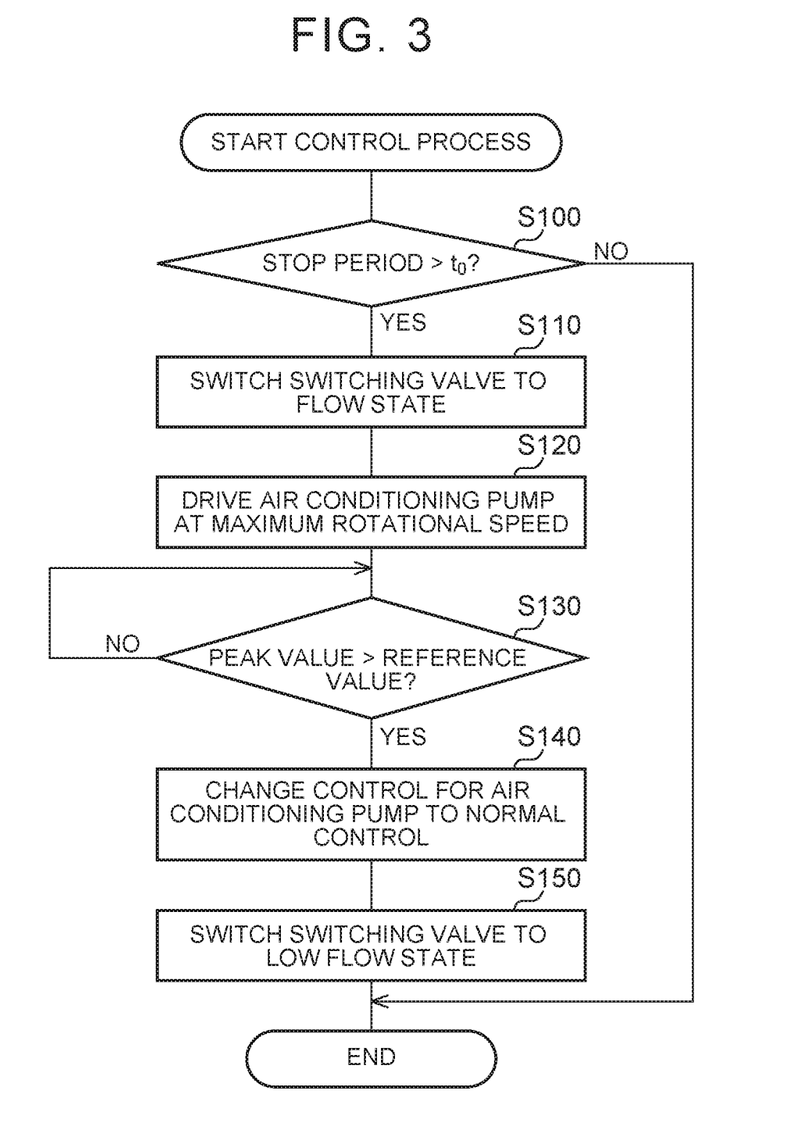
FIG. 3 is a flowchart of a start control process routine.

FIG. 3 is a flowchart of a start control process routine that is executed by the CPU of control unit 900. This routine is started and executed when an instruction to start the fuel cell system 15 is input, such as, e.g., when a start switch (not shown) of the fuel cell vehicle is pressed by the driver.

When this routine is started, the CPU of the control unit 900 determines whether a stop period, which is a period from the time the fuel cell system 15 is stopped until an instruction to start the fuel cell system 15 is input, is longer than a predetermined reference period to (step S100). The stop period is specifically a period until the start switch of the fuel cell vehicle is turned on after it is turned off and is measured by a timer of the control unit 900. The reference period to is set in advance to a lower limit of the stop period during which the conductivity of the cooling medium in the first cooling medium circuit 505 may increase to an unacceptable level due to an increase in average ion concentration of the cooling medium in the first cooling medium circuit 505 which is caused by ions eluted from the radiator 530 etc. into the cooling medium. The reference period to is stored in the memory of the control unit 900. The reference period to can be set to, e.g., any period from one week (168 hours) to two weeks (336 hours).

When the stop period is longer than the reference period to in step S100 (step S100: YES), the CPU of the control unit 900 drives the switching valve 740 to switch the switching valve 740 to the "flow state" in which the cooling medium in the second cooling medium circuit 705 flows into the first cooling medium circuit 505 (step S110). When the switching valve 740 is in the "flow state" while the fuel cell system 15 is stopped, the "flow state" is maintained in step S110.

The CPU of the control unit 900 then outputs a drive signal to the air conditioning pump 725 to operate the air conditioning pump 725 at a maximum rotational speed (step S120). The maximum rotational speed is, e.g., a value described as a maximum rotational speed in a catalog of a motor for the air conditioning pump 725. As the air conditioning pump 725 is rotated at the maximum rotational speed, the discharge flow rate of the air conditioning pump 725 is maximized. The switching valve 740 is thus switched in step S110 and the air conditioning pump 725 is driven in step S120, whereby the cooling medium in the second cooling medium circuit 705 flows into the first cooling medium circuit 505. The cooling medium in the first cooling medium circuit 505 also flows into the second cooling medium circuit 705.

In the present embodiment, when the start control process routine is executed, warming up of the fuel cell stack 600 is started, and driving of the cooling medium pump 525 is also started. The cooling medium thus circulates in the first cooling medium circuit 505. At this time, the flow divider valve 565 is adjusted so that the cooling medium flowing in the first cooling medium circuit 505 flows through both the radiator 530 and the cooling medium bypass pipe 550. As the cooling medium thus flows through the radiator 530, the cooling medium having stayed in the radiator 530 and having relatively high ion concentration circulates in the first cooling medium circuit 505. As the cooling medium having stayed in the radiator 530 is thus mixed with the cooling medium flowing in the first cooling medium circuit 505, the ion concentration of the cooling medium in the first cooling medium circuit 505 is increased. The cooling medium in the first cooling medium circuit 505 which has the relatively high ion concentration is diluted with the cooling medium flowing from the second cooling medium circuit 705 into the first cooling medium circuit 505. As the cooling medium flows through the cooling medium bypass pipe 550, ions in the cooling medium are removed by the ion exchanger 540, whereby the ion concentration of the cooling medium flowing in the first cooling medium circuit 505 is reduced. The operation of causing the cooling medium flowing in the first cooling medium circuit 505 to flow through the radiator 530 and the operation of causing the cooling medium flowing in the first cooling medium circuit 505 to flow through the cooling medium bypass pipe 550 need not necessarily be started simultaneously. For example, the operation of adjusting the flow divider valve 565 so that the cooling medium flows into the radiator 530 to diffuse ions staying in the radiator 530 into the first cooling medium circuit 505 may be performed first.

The CPU of the control unit 900 then determines whether the peak value Vk detected by the insulation resistance detection unit 91 is larger than a predetermined first reference value (step S130). As described above, the peak value Vk is a value indicating the insulation resistance in the first cooling medium circuit 505. The first reference value that is used for determination in step S130 is determined in advance as a value that is acceptable as the insulation resistance in the first cooling medium circuit 505 at the time the fuel cell stack 600 reaches a steady state and generates electric power. The first reference value is stored in the memory of the control unit 900. The steady state of the fuel cell stack 600 may be, e.g., the state in which the fuel cell stack 600 has been heated enough to generate maximum output power. The value that is acceptable as the insulation resistance in the first cooling medium circuit 505 when the fuel cell stack 600 is in the steady state can be determined in view of, e.g., laws and regulations etc. for fuel cell systems and vehicles.

When the fuel cell stack 600 is in the steady state, the temperature of the cooling medium is typically higher than when the fuel cell system 15 is started. The higher the temperature of the cooling medium is, the higher the conductivity of the cooling medium becomes even when the ion concentration of the cooling medium is the same. The insulation resistance in the first cooling medium circuit 505 decreases as the conductivity of the cooling medium in the first cooling medium circuit 505 increases. Accordingly, the first reference value may be set to a value larger than the insulation resistance that is allowed when the fuel cell stack 600 is in the steady state, in view of an increase in temperature of the cooling medium.

When the CPU of the control unit 900 determines in step S130 that the peak value Vk is equal to or smaller than the first reference value (step S130: NO), the CPU of the control unit 900 repeats step S130 until the peak value Vk becomes larger than the first reference value.

When the CPU of the control unit 900 determines in step S130 that the peak value Vk is larger than the first reference value (step S130: YES), the CPU of the control unit 900 changes the control for the air conditioning pump 725 to normal control (step S140). The CPU of the control unit 900 then switches the switching valve 740 to the "low flow state" in which the flow of the cooling medium from the second cooling medium circuit 705 into the first cooling medium circuit 505 is reduced as compared to the "flow state" (step S150), and terminates the routine. The flow of the cooling medium between the first cooling medium circuit 505 and the second cooling medium circuit 705 is thus cut off. The normal control for the air conditioning pump 725 which is used in step S140 is control in which the air conditioning pump 725 is driven according to the heating state of the interior of the fuel cell vehicle. For example, when the interior of the fuel cell vehicle is not heated, the air conditioning pump 725 may be stopped. The operation in step S130 and the operation in step S140 may be performed simultaneously or may be performed in reverse order from that described above.

In step S100, when the stop period is equal to or shorter than the reference period to (step S100: NO), the CPU of the control unit 900 terminates the routine. After terminating the routine, the CPU of the control unit 900 starts, e.g., control for warming up of the fuel cell stack 600. At this time, for example, in the case where the switching valve 740 is in the "low flow state" while the fuel cell system 15 is stopped, the CPU of the control unit 900 only needs to maintain the "low flow state." In the case where the switching valve 740 is in the "flow state" while the fuel cell system 15 is stopped, the CPU of the control unit 900 may switch the switching valve 740 to the "low flow state." Alternatively, the fuel cell system 15 may have an operation mode in which, even when the stop period is equal to or shorter than the reference period to, the CPU of the control unit 900 sets the switching valve 740 to the "flow state" so that the cooling medium heated in the fuel cell stack 600 flows into the second cooling medium circuit 705. In such an operation mode, the air conditioning pump 725 may be driven or may not be driven.

According to the fuel cell system 15 of the present embodiment configured as described above, when the stop period of the fuel cell system 15 is longer than the reference period to, the cooling medium in the second cooling medium circuit 705 is caused to flow into the first cooling medium circuit 505 after an instruction to start the fuel cell system 15 is input. Accordingly, even in the case where the stop period of the fuel cell system 15 is longer than the reference period to and therefore the ion concentration of the cooling medium in the first cooling medium circuit 505 increases due to ions eluted from the radiator 530 etc., the ion concentration of the cooling medium in the first cooling medium circuit 505 can be more quickly reduced when the fuel cell system 15 is started. As a result, the insulation resistance in the first cooling medium circuit 505 can be increased. The cooling medium in the first cooling medium circuit 505 is in direct contact with the fuel cell stack 600 that is a high voltage device. Accordingly, the occurrence of problems such as electric leakage in the fuel cell stack 600 is more sufficiently reduced by increasing the insulation resistance in the first cooling medium circuit 505.

Even in the case where, unlike the present embodiment, the cooling medium in the second cooling medium circuit 705 is not allowed to flow into the first cooling medium circuit 505 when the fuel cell system 15 is started, it still is possible to gradually reduce the ion concentration of the cooling medium in the first cooling medium circuit 505 by using the ion exchanger 540. According to the present embodiment, the ion concentration of the cooling medium in the first cooling medium circuit 505 can be more quickly reduced by causing the cooling medium in the second cooling medium circuit 705 to flow into the first cooling medium circuit 505. Accordingly, for example, even when the fuel cell stack 600 is caused to generate electric power as soon as the fuel cell system 15 is started, the conductivity of the cooling medium in the first cooling medium circuit 505 can be easily reduced.

In the fuel cell system 15, the pipes that form the first cooling medium circuit 505 and the radiator 530 may be made of a material from which a very small amount of ions are eluted in order to reduce the amount of ions that are eluted into the cooling medium while the fuel cell system 15 is stopped. In this case, however, the manufacturing conditions for each part that forms the first cooling medium circuit 505 are limited, and the manufacturing cost may increase. Alternatively, the surface of each part that forms the first cooling medium circuit 505 may be coated with a resin etc. that restrains elution of ions. In this case, however, the manufacturing process is complicated and the manufacturing cost increases. Moreover, when the coating is deteriorated, a larger amount of ions are eluted into the cooling medium. According to the present embodiment, the conductivity of the cooling medium in the first cooling medium circuit 505 is easily reduced upon starting of the fuel cell system 15 without causing these disadvantages.

According to the fuel cell system 15 of the present embodiment, when the insulation resistance of the fuel cell stack 600 insulated from the ground by the insulation path including the cooling medium of the first cooling medium circuit 505 increases to the first reference value, the switching valve 740 is switched to the "low flow state." Since the "flow state" is maintained until the insulation resistance increases to the first reference value, the fuel cell stack 600 is restrained from generating electric power when the insulation resistance is equal to or lower than the first reference value.

B. Second Embodiment

Figure 4:
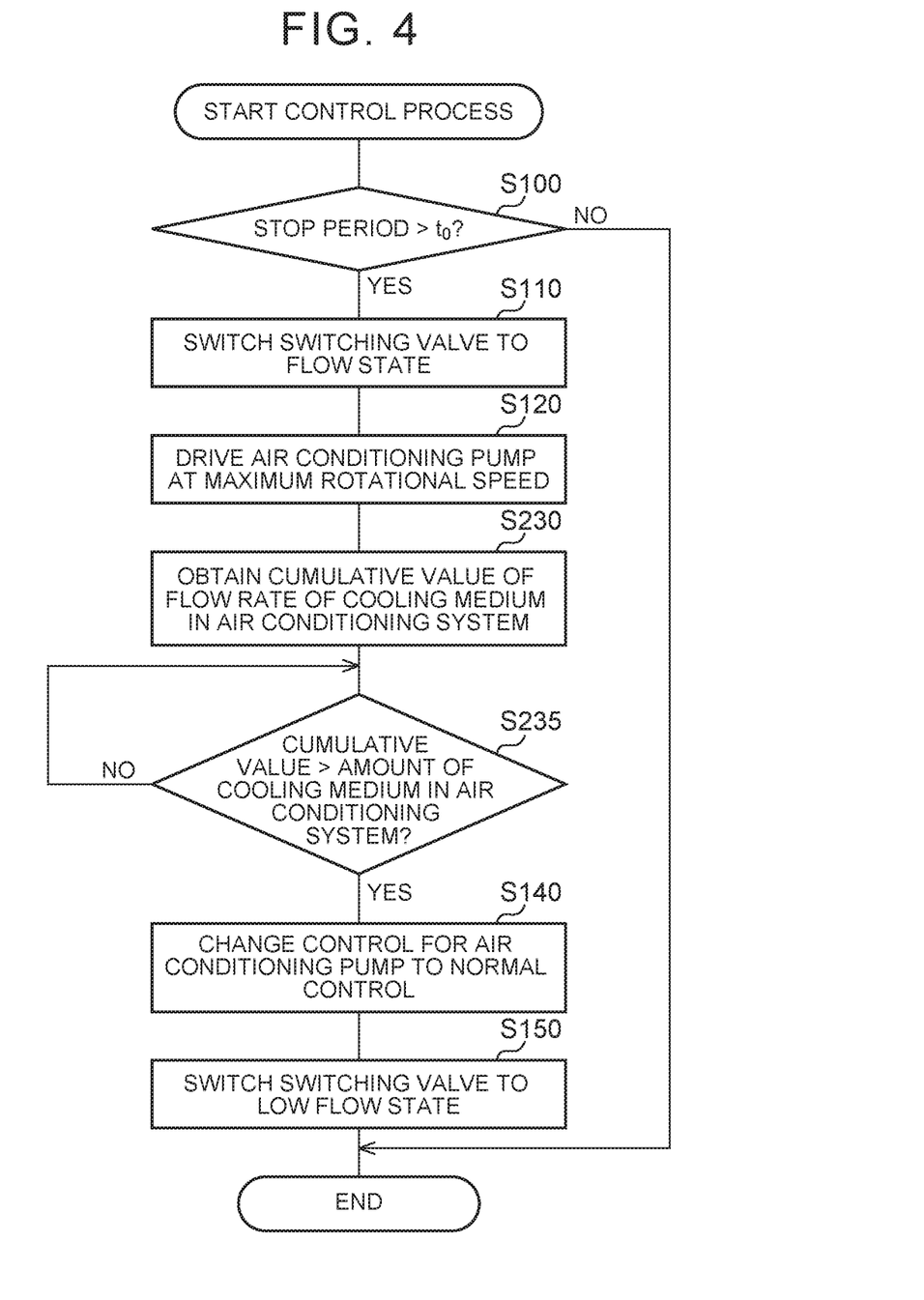
FIG. 4 is a flowchart of another start control process routine.

FIG. 4 is a flowchart of a start control process routine that is executed by the CPU of the control unit 900 of the fuel cell system 15 according to a second embodiment of the disclosure. Since the fuel cell system 15 of the second embodiment has a configuration similar to that of the first embodiment, detailed description thereof will be omitted.

As in the first embodiment, the start control process routine of FIG. 4 is started and executed when an instruction to start the fuel cell system 15 is input. In FIG. 4, the same steps as those of FIG. 3 are denoted by the same step numbers, and detailed description thereof will be omitted.

In the present embodiment, a criterion for determining when to switch the switching valve 740 from the "flow state" in which the cooling medium flows from the second cooling medium circuit 705 into the first cooling medium circuit 505 to the "low flow state" is different from that of the first embodiment. In the second embodiment, steps S230 and S235 are executed instead of step S130 of the first embodiment.

In the second embodiment, the CPU of the control unit 900 drives the air conditioning pump 725 at the maximum rotational speed in step S120 and then obtains the flow rate of the cooling medium in the air conditioning system 700, namely a cumulative value of the flow rate of the cooling medium having flowed through the second cooling medium circuit 705 (step S230). The cumulative value of the flow rate of the cooling medium in the second cooling medium circuit 705 is calculated using the operating time of the air conditioning pump 725 since the start of the driving of the air conditioning pump 725 and the rotational speed (in the present embodiment, the maximum rotational speed) of the air conditioning pump 725. As described above, the control unit 900 functions as a "flow rate deriving unit" that derives the cumulative value of the flow rate of the cooling medium having flowed through the second cooling medium circuit 705, after the cooling medium starts flowing from the second cooling medium circuit 705 into the first cooling medium circuit 505 as a result of driving the air conditioning pump 725 with the switching valve 740 switched to the "flow state."

The CPU of the control unit 900 then compares the cumulative value of the flow rate of the cooling medium obtained in step S230 with the amount of cooling medium in the air conditioning system 700, that is, the amount of cooling medium in the second cooling medium circuit 705 (step S235). The amount of cooling medium in the second cooling medium circuit 705 is the capacity of the cooling medium pipes that form the second cooling medium circuit 705 and is stored in advance in the memory of the control unit 900. When the CPU of the control unit 900 determines in step S235 that the cumulative value of the flow rate of the cooling medium in the second cooling medium circuit 705 is equal to or smaller than the amount of cooling medium in the second cooling medium circuit 705 (step S235: NO), the CPU of the control unit 900 repeats step S235 until the cumulative value becomes larger than the amount of cooling medium in the second cooling medium circuit 705.

When the CPU of the control unit 900 determines in step S235 that the cumulative value of the flow rate of the cooling medium in the second cooling medium circuit 705 is larger than the amount of cooling medium in the second cooling medium circuit 705 (step S235: YES), the CPU of the control unit 900 executes steps S140 and S150 described above and terminates the routine. The CPU of the control unit 900 determines in step S235 that the cumulative value of the flow rate of the cooling medium in the second cooling medium circuit 705 is larger than the amount of cooling medium in the second cooling medium circuit 705 when all of the cooling medium with relatively low ion concentration which had been present in the second cooling medium circuit 705 has flowed into the first cooling medium circuit 505 and the cooling medium in the second cooling medium circuit 705 has been replaced.

This configuration has effects similar to those of the first embodiment. That is, even when the ion concentration of the cooling medium in the first cooling medium circuit 505 increases because the fuel cell system 15 is stopped for a long period, the ion concentration of the cooling medium in the first cooling medium circuit 505 can be more quickly reduced when the fuel cell system 15 is started.

In the second embodiment, the switching valve 740 is switched to the "low flow state" when all of the cooling medium with relatively low ion concentration which had been present in the second cooling medium circuit 705 upon starting of the fuel cell system 15 has flowed into the first cooling medium circuit 505. Once the switching valve 740 is switched to the "low flow state," the cooling medium in the second cooling medium circuit 705 will not flow into the first cooling medium circuit 505 and will not flow through the ion exchanger 540. Accordingly, during the operation of reducing the ion concentration of the cooling medium using the ion exchanger 540, the total amount of cooling medium whose ion concentration needs to be reduced using the ion exchanger 540 decreases by an amount corresponding to the cooling medium capacity of the second cooling medium circuit 705 once the switching valve 740 is switched to the "low flow state." The conductivity of the cooling medium in the first cooling medium circuit 505 is thus more quickly reduced.

Figure 5:
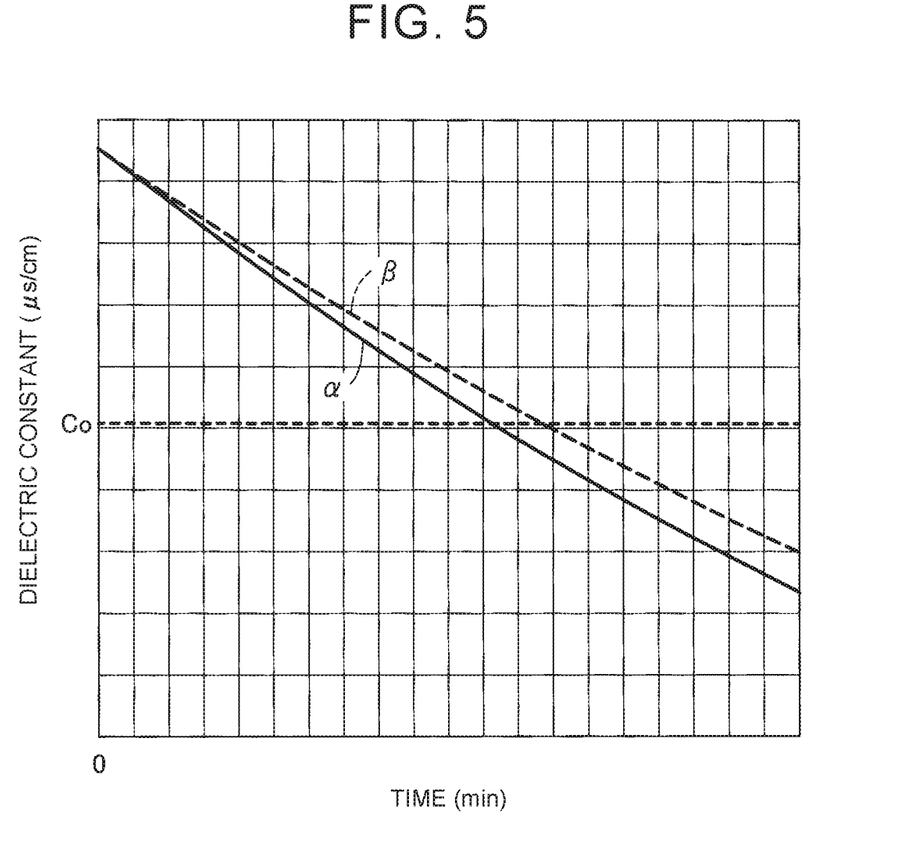
FIG. 5 is a graph conceptually illustrating how the conductivity of a cooling medium in a first cooling medium circuit decreases.

FIG. 5 is a graph conceptually illustrating how the conductivity of the cooling medium in the first cooling medium circuit 505 decreases during the operation of removing ions in the cooling medium in the first cooling medium circuit 505 using the ion exchanger 540. The line α illustrates how the conductivity of the cooling medium in the first cooling medium circuit 505 decreases after the switching valve 740 is switched to the "low flow state" in step S150 at time 0. The line β illustrates how the conductivity of the cooling medium in the first cooling medium circuit 505 decreases in the case where the switching valve 740 is not switched to the "low flow state" at time 0, namely when the "flow state" is maintained. Once the switching valve 740 is switched to the "low flow state," the cooling medium in the second cooling medium circuit 705 will not flow into the first cooling medium circuit 505. The amount of cooling medium whose ion concentration is to be reduced by the ion exchanger 540 therefore decreases by the amount corresponding to the cooling medium capacity of the second cooling medium circuit 705. Accordingly, in the case of the line α in which the switching valve 740 is switched to the "low flow state," the conductivity of the cooling medium in the first cooling medium circuit 505 decreases more quickly than in the case of the line β in which the switching valve 740 is not switched to the "low flow state."

In FIG. 5, the conductivity $C_0$ is a target upper limit of the conductivity of the cooling medium in the first cooling medium circuit 505 after the fuel cell stack 600 reaches the steady state. When the fuel cell stack 600 is in the steady state, control for flow of the cooling medium is performed so that the conductivity of the cooling medium in the first cooling medium circuit 505 does not become larger than the target upper limit, namely so that the insulation resistance in the first cooling medium circuit 505 does not become lower than the insulation resistance corresponding to the target upper limit of the conductivity. Such a target upper limit of the conductivity can be determined in view of, e.g., rules etc.

defined by the laws and regulations for fuel cell systems and vehicles. As the difference between the ion concentration of the cooling medium in the first cooling medium circuit 505 and the ion concentration of the cooling medium in the second cooling medium circuit 705 decreases, the effect in reducing the ion concentration of the cooling medium in the first cooling medium circuit 505 by causing the cooling medium in the second cooling medium circuit 705 to flow into the first cooling medium circuit 505 becomes smaller. Accordingly, the conductivity of the cooling medium in the first cooling medium circuit 505 is more quickly reduced to the conductivity $C_0$ or less, namely to the target upper limit value in the steady state or less, by switching the switching valve 740 to the "low flow state" at an appropriate timing as shown in FIG. 5.

In step S235 of the second embodiment, the cumulative value of the flow rate of the cooling medium in the second cooling medium circuit 705 is compared with the amount of cooling medium in the second cooling medium circuit 705. However, the disclosure may have a different configuration. That is, a value other than the amount of cooling medium in the second cooling medium circuit 705 may be used as a second reference value to be compared with the cumulative value of the flow rate of the cooling medium in the second cooling medium circuit 705 in step S235. For example, the second reference value may be a value smaller than the amount of cooling medium in the second cooling medium circuit 705 as long as the ion concentration of the cooling medium in the first cooling medium circuit 505 is reduced to a desirable extent by causing the cooling medium in the second cooling medium circuit 705 to flow into the first cooling medium circuit 505. In this case as well, the rate at which the ion concentration of the cooling medium in the first cooling medium circuit 505 is subsequently reduced by the ion exchanger 540 can be increased.

C. Other Embodiments (C1) In the above embodiments, when the cooling medium in the second cooling medium circuit 705 is caused to flow into the first cooling medium circuit 505 upon starting of the fuel cell system 15, the cooling medium is caused to flow through both the radiator 530 and the ion exchanger 540 in the first cooling medium circuit 505 and warming up of the fuel cell stack 600 is started. However, the disclosure may have a different configuration.

For example, when the cooling medium in the second cooling medium circuit 705 is caused to flow into the first cooling medium circuit 505 upon starting of the fuel cell system 15, the flow divider valve 565 may be switched so that the cooling medium flows through only one of the radiator 530 and the ion exchanger 540. For example, in the case where a particularly large amount of ions is eluted from the radiator 530 into the cooling medium as in the above embodiments, the cooling medium can be first caused to flow only through the radiator 530 to increase the overall ion concentration in the first cooling medium circuit 505. Ions can thus be removed with higher efficiency when the cooling medium is subsequently caused to flow through the ion exchanger 540. Alternatively, in the case where a particularly small amount of ions is eluted from the radiator 530 into the cooling medium due to the material of the radiator 530 etc. unlike the above embodiments, the cooling medium may not be caused to flow through the radiator 530 upon starting of the fuel cell system 15 until warming up of the fuel cell stack 600 is completed. In this case, the ion concentration of the cooling medium is efficiently reduced in a portion other than the radiator 530 where the ion concentration of the cooling medium is high, and the efficiency in warming up of the fuel cell stack 600 is increased.

For example, in the case where the fuel cell system 15 is started at an ambient temperature below the freezing point, the fuel cell stack 600 may be warmed up before causing the cooling medium in the second cooling medium circuit 705 to flow into the first cooling medium circuit 505. In this case, after the cooling medium in the first cooling medium circuit 505 is heated to 0° C. or higher by the warming up of the fuel cell stack 600, the switching valve 740 is switched to the "flow state" so that the cooling medium in the second cooling medium circuit 705 flows into the first cooling medium circuit 505. Alternatively, in the case where the warming up of the fuel cell stack 600 and the operation of causing the cooling medium in the second cooling medium circuit 705 to flow into the first cooling medium circuit 505 are performed simultaneously when the fuel cell system 15 is started below the freezing point, the flow divider valve 565 is adjusted so that the cooling medium bypasses the radiator 530.

(C2) In the first embodiment, the peak value is detected as the insulation resistance using the insulation resistance detection unit 91 shown in FIG. 2. However, different means may be used to detect the insulation resistance of the fuel cell stack 600 insulated from the ground by the insulation path including the cooling medium in the first cooling medium circuit 505. Alternatively, instead of the insulation resistance detection unit 91, a conductivity sensor that measures the conductivity of the cooling medium in the first cooling medium circuit 505 or an ion concentration sensor that measures the ion concentration of the cooling medium in the first cooling medium circuit 505 may be provided to measure the conductivity or ion concentration of the cooling medium flowing in the first cooling medium circuit 505. In this case, the switching valve 740 may be switched to the "low flow state" when it is determined in step S130 that the measured conductivity is lower than a third reference value determined in advance for the conductivity or that the measured ion concentration is lower than a third reference value determined in advance for the ion concentration.

(C3) The timing at which the switching valve 740 is switched to the "low flow state" to stop the cooling medium in the second cooling medium circuit 705 from flowing into the first cooling medium circuit 505 when the stop period is longer than the reference period upon starting of the fuel cell system 15 may be different from the first embodiment and the second embodiment. Even when the switching valve 740 is switched at a different timing, this configuration also has the effect of reducing the ion concentration of the cooling medium in the first cooling medium circuit 505 as the switching valve 740 is in the "flow state" before being switched to the "low flow state."

(C4) In the above embodiments, when the stop period is longer than the reference period upon starting of the fuel cell system 15, it is determined that the operation of causing the cooling medium in the second cooling medium circuit 705 to flow into the first cooling medium circuit 505 should be performed. However, whether this operation should be performed may also be determined based on other factors that affect the amount of ions that are eluted into the cooling medium. For example, whether this operation should be performed may be determined based on the temperature during the stop period in addition to the length of the stop period. This is because the higher the temperature during the stop period is, the larger the amount of ions eluted into the cooling medium is. Accordingly, for example, the reference period may be set to a smaller value as the ambient temperature while the fuel cell system 15 is stopped is higher.

(C5) In the above embodiments, the air conditioning pump 725 is used as a pump for causing the cooling medium in the second cooling medium circuit 705 to flow into the first cooling medium circuit 505. However, the disclosure may have a different configuration. For example, in the case where the cooling medium in the second cooling medium circuit 705 can be caused to flow into the first cooling medium circuit 505 by driving only the cooling medium pump 525 in the "flow state," the cooling medium pump 525 may be used as a pump that causes the cooling medium in the second cooling medium circuit 705 to flow into the first cooling medium circuit 505. In this case, the air conditioning pump 725 is not driven but only the cooling medium pump 525 is driven in step S120.

(C6) In the above embodiments, the fuel cell system 15 is used as a power supply for driving a vehicle. However, the disclosure may have a different configuration. For example, the fuel cell system 15 may be used as a power supply for driving a moving body other than a vehicle, or the fuel cell system 15 may be used as a stationary power supply. Any fuel cell system having a first cooling medium circuit through which a cooling medium for cooling a fuel cell stack flows and a second cooling medium circuit which can be connected to the first cooling medium circuit and in which the average ion concentration of the cooling medium while the flow of the cooling medium is stopped is lower than in the first cooling medium circuit can more quickly reduce the conductivity of the cooling medium in the first cooling medium circuit upon starting of the fuel cell system by performing control similar to that of the above embodiments.

The disclosure is not limited to the above embodiments and can be implemented with various configurations without departing from the spirit and scope of the disclosure. For example, the technical features in the embodiments, which correspond to the technical features in each form described in the section "SUMMARY," may be replaced or combined as appropriate in order to solve a part or all of the problems described above or to provide a part or all of the effects described above. Any of the technical features can be omitted as appropriate unless described as essential in the specification.

What is claimed is:

1. A fuel cell system, comprising:
   a fuel cell stack;
   a first cooling medium circuit through which a cooling medium for cooling the fuel cell stack flows;
   an ion exchanger provided in the first cooling medium circuit and configured to remove ions in the cooling medium flowing in the first cooling medium circuit;
   a second cooling medium circuit which is allowed to be connected to the first cooling medium circuit and in which the average ion concentration of cooling medium in the second cooling medium circuit is lower than that of the cooling medium in the first cooling medium circuit, the average ion concentration being the average ion concentration of the cooling medium while flow of the cooling medium is stopped;
   a switching valve configured to switch between a flow state and a low flow state, the flow state being a state in which the cooling medium having flowed through the second cooling medium circuit flows into the first cooling medium circuit, and the low flow state being a state in which the flow of the cooling medium from the second cooling medium circuit into the first cooling medium circuit is reduced as compared to the flow state;

a pump configured to cause the cooling medium in the second cooling medium circuit to flow into the first cooling medium circuit when the switching valve is in the flow state; and a control unit configured such that, when a stop period, which is a period from a time the fuel cell system is stopped until an instruction to start the fuel cell system is input, is longer than a predetermined reference period, the control unit drives the pump with the switching valve switched to the flow state after the instruction to start the fuel cell system is input.

2. The fuel cell system according to claim 1, further comprising:

an insulation resistance detection unit configured to detect insulation resistance of the fuel cell stack insulated from ground by an insulation path including the cooling medium in the first cooling medium circuit, wherein the control unit is configured such that, after driving the pump with the switching valve switched to the flow state, the control unit switches the switching valve to the low flow state when the insulation resistance detected by the insulation resistance detection unit becomes higher than a predetermined first reference value.

3. The fuel cell system according to claim 1, further comprising:

a flow rate deriving unit configured to derive a cumulative value of a flow rate of the cooling medium having flowed through the second cooling medium circuit, after the cooling medium starts flowing from the second cooling medium circuit into the first cooling medium circuit as a result of driving the pump with the switching valve switched to the flow state, wherein the control unit is configured to switch the switching valve to the low flow state when the cumulative value of the flow rate of the cooling medium derived by the flow rate deriving unit becomes larger than a predetermined second reference value.

4. The fuel cell system according to claim 1, further comprising:

a conductivity sensor configured to measure conductivity of the cooling medium in the first cooling medium circuit, or an ion concentration sensor configured to measure ion concentration of the cooling medium in the first cooling medium circuit, wherein the control unit is configured to switch the switching valve to the low flow state when the conductivity measured by the conductivity sensor becomes lower than a third reference value determined in advance for the conductivity, or when the ion concentration measured by the ion concentration sensor becomes lower than a third reference value determined in advance for the ion concentration, after the control unit drives the pump with the switching valve switched to the flow state.

5. The fuel cell system according to claim 1, wherein the control unit is configured to, when the stop period is equal to or shorter than the reference period, set the switching valve to the low flow state after the instruction to start the fuel cell system is input.

6. The fuel cell system according to claim 1, wherein the second cooling medium circuit is an air conditioning circuit configured to perform heating using heat of the cooling medium in the second cooling medium circuit.

* * * * *